United States Patent [19]
Phillips

[11] 3,888,959
[45] June 10, 1975

[54] PROGRESSIVE MOLDING METHOD
[76] Inventor: Buster C. Phillips, 550 Morgan Street, West Liberty, Ky. 41472
[22] Filed: Nov. 15, 1973
[21] Appl. No.: 416,324

Related U.S. Application Data
[63] Continuation-in-part of Ser. No. 238,805, March 28, 1972, abandoned.

[52] U.S. Cl. ............... 264/32; 29/429; 29/456; 264/33; 264/34; 264/166; 264/316; 264/334; 425/63
[51] Int. Cl. .............................. E04b 1/16
[58] Field of Search ......... 264/32, 33, 34, 166, 316, 264/334, 336; 425/63, 64; 249/20; 29/429, 456

[56] References Cited
UNITED STATES PATENTS
| | | | |
|---|---|---|---|
| 2,706,851 | 4/1955 | Stout | 29/456 |
| 3,497,579 | 2/1970 | Barron | 264/33 |
| 3,784,667 | 1/1974 | Drostholm et al. | 264/166 X |

Primary Examiner—Robert F. White
Assistant Examiner—Thomas P. Pavelko

[57] ABSTRACT

A wall is constructed from a continuous flexible strip or bar that is progressively wound upon itself and releasably interlocked under pressure to form a continuous wall around an enclosed space. The pressure locked strip may be formed of plastic or other suitable material and an apparatus is provided for pressure locking the strip together to form a peripheral wall with the peripheral wall being capable of use as one wall of a mold or form that coacts with a similar or other wall spaced therefrom to receive a hardenable and settable material therebetween. The two walls may be progressively stripped from the bottom of the hardenable material which has hardened sufficiently to be self-sustaining, and reapplied to the top of the walls as new material is placed therebetween enabling a continuous wall forming process to be used.

10 Claims, 11 Drawing Figures

PATENTED JUN 10 1975

3,888,959

SHEET 1

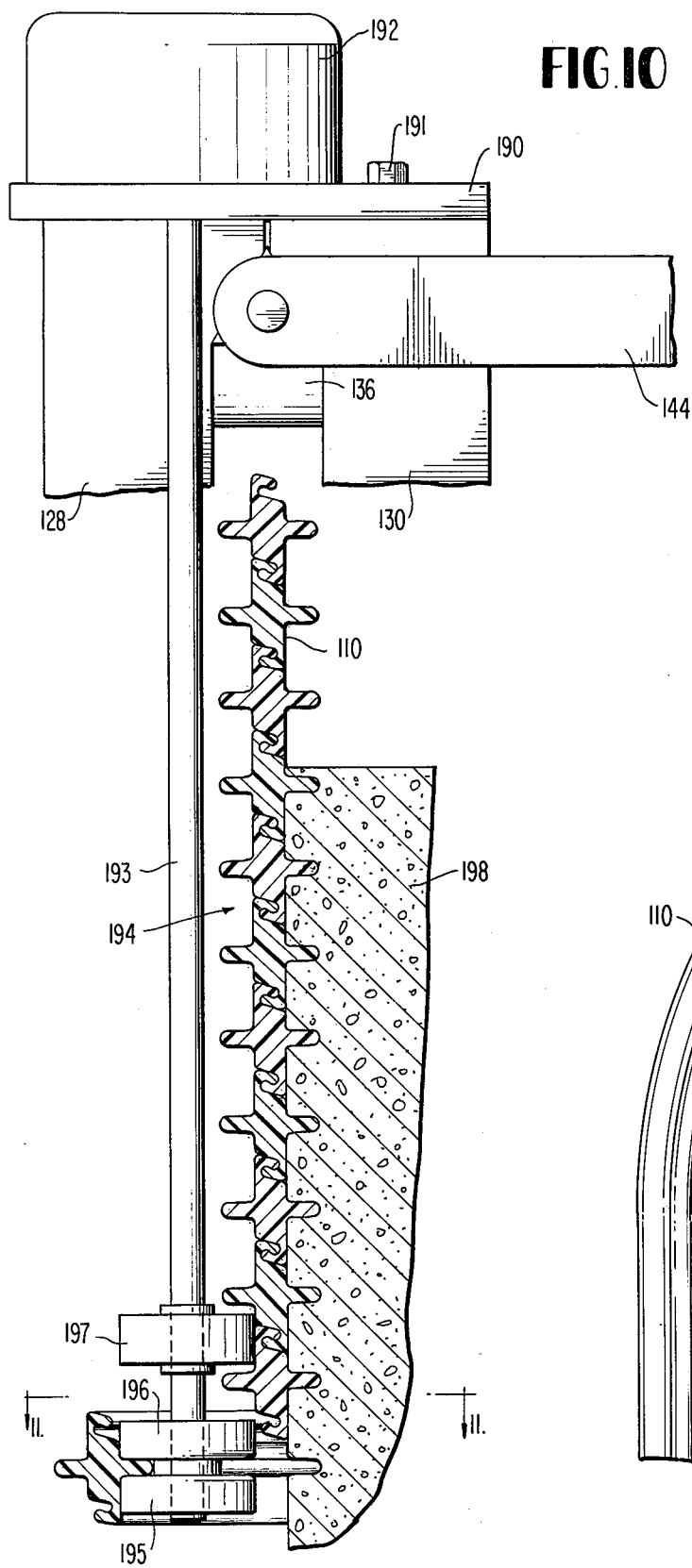
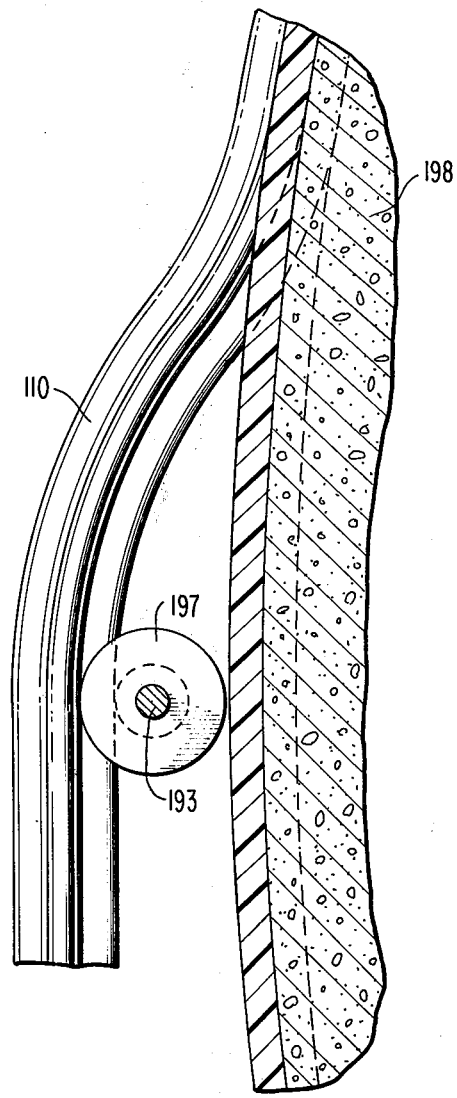
FIG.10
FIG.11

3,888,959

PROGRESSIVE MOLDING METHOD

REFERENCE TO PRIOR APPLICATIONS

This is a continuation-in-part of my prior application Ser. No. 238,805, filed Mar. 28, 1972, and now abandoned.

BACKGROUND OF THE INVENTION

1. Field of the Invention

The present invention generally relates to the process of in situ construction of a monolithic wall, column, or the like, and more particularly a process where a strip of material is progressively wound upon itself wth the convolutions of the strip being interlocked to form a continuous peripheral wall suitable for use as a wall of a mold or form for the pouring of hardenable material.

2. Description of the Prior Art

Building wall structures are conventionally formed from modules such as bricks, concrete blocks and the like and in some instances larger rectangular modules are employed, or a wall or other component may be formed in situ by casting from a hardenable or setting material such as concrete or the like, hereinafter sometimes referred to generally as hardenable material. When monolithic walls are formed by pouring cementitious material in place, it is necessary to provide forms having spaced walls to confine the material while being cast or poured and after the material has hardened or set up, the forms are stripped and discarded or moved to another position for pouring another section of the wall. While such procedures have been used extensively in the building industry, certain inefficiencies are introduced by virtue of the procedure being basically a batch operation in which one section of wall is formed at a time and the equipment for forming the wall section is more or less idle while the complete wall section is setting up or hardening.

SUMMARY OF THE INVENTION

The present invention provides a continuous process of forming a structure such as a column, cylinder, or wall for a building or the like by pouring or casting a hardenable material in a form including a wall formed from a strip of material that is progressively wound upon itself with the successive convolutions being releasably locked together so that the wall may be formed of a continuous strip.

Another object of the invention is to provide such a form wall in which the strip is progressively removed from one end of the form wall for the hardenable material and applied to the other end of the wall to thereby progressively construct a form from one end and remove the form wall from the other end as the hardenable material hardens.

A further object of the invention is to provide a form wall construction process in accordance with the preceding objects in which the strip is in the form of a plastic bar having interlocking tongues and grooves and structural features which enable an apparatus to effectively pressure lock the plastic bar or strip in successive, generally spiral convolutions to form a continuous peripheral wall of various shapes and configurations.

Yet another important feature of the invention is to provide a form wall construction process in which the apparatus for assembling the continuous strip into convolutions is self-contained and controlled so that it will move in the desired path during assembly of the sequential convolutions which define the wall.

Another object is to simultaneously form a pair of such walls in concentric spaced relation, and filling the space therebetween with a hardenable material to thereby form a rigid permanent wall structure.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 10 is a fragmentary sectional view, in elevation, of the apparatus for removing the plastic strip from the bottom of the form wall after the hardenable material in the form has set; and FIG. 11 is a sectional view taken on line 11--11 of FIG. 10.

DESCRIPTION OF THE PREFERRED EMBODIMENTS

Figure 1:
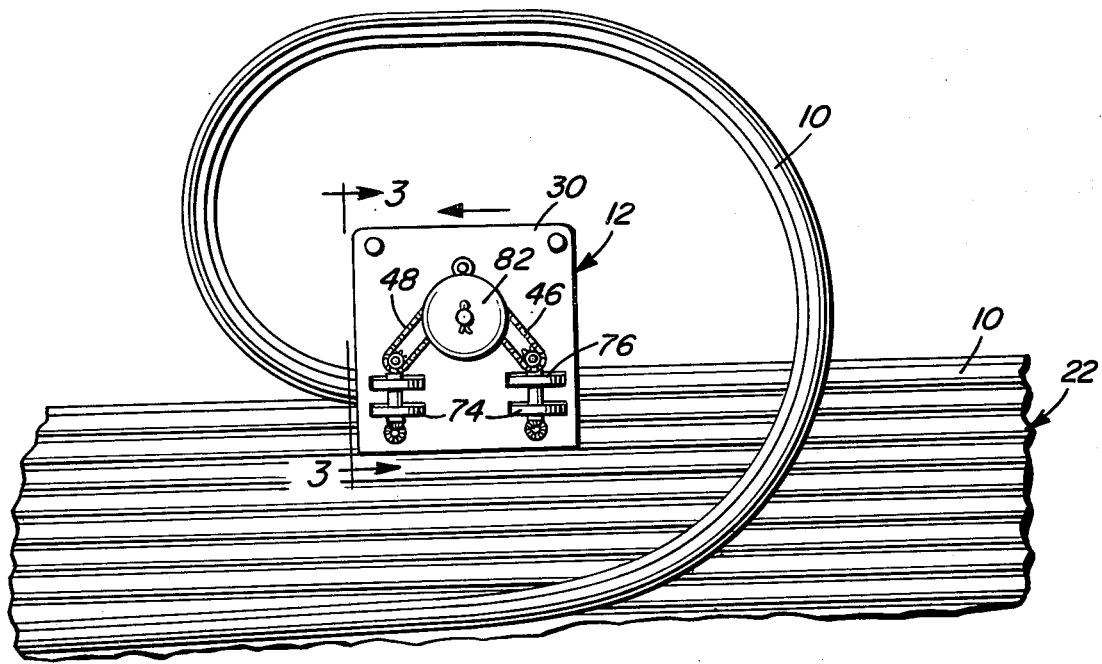
FIG. 1 is a side elevational view of a portion of a form wall according to the invention and illustrating the strip from which the wall is formed being removed from the bottom and reapplied to the top of the wall, and an apparatus employed for forming the wall from the strip.
Figure 2:
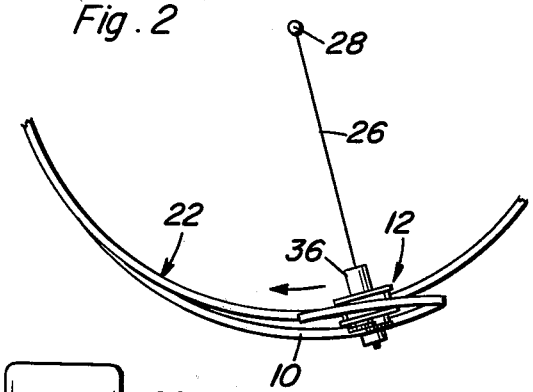
FIG. 2 is a fragmental plan view of the assembly of FIG. 1.
Figure 3:
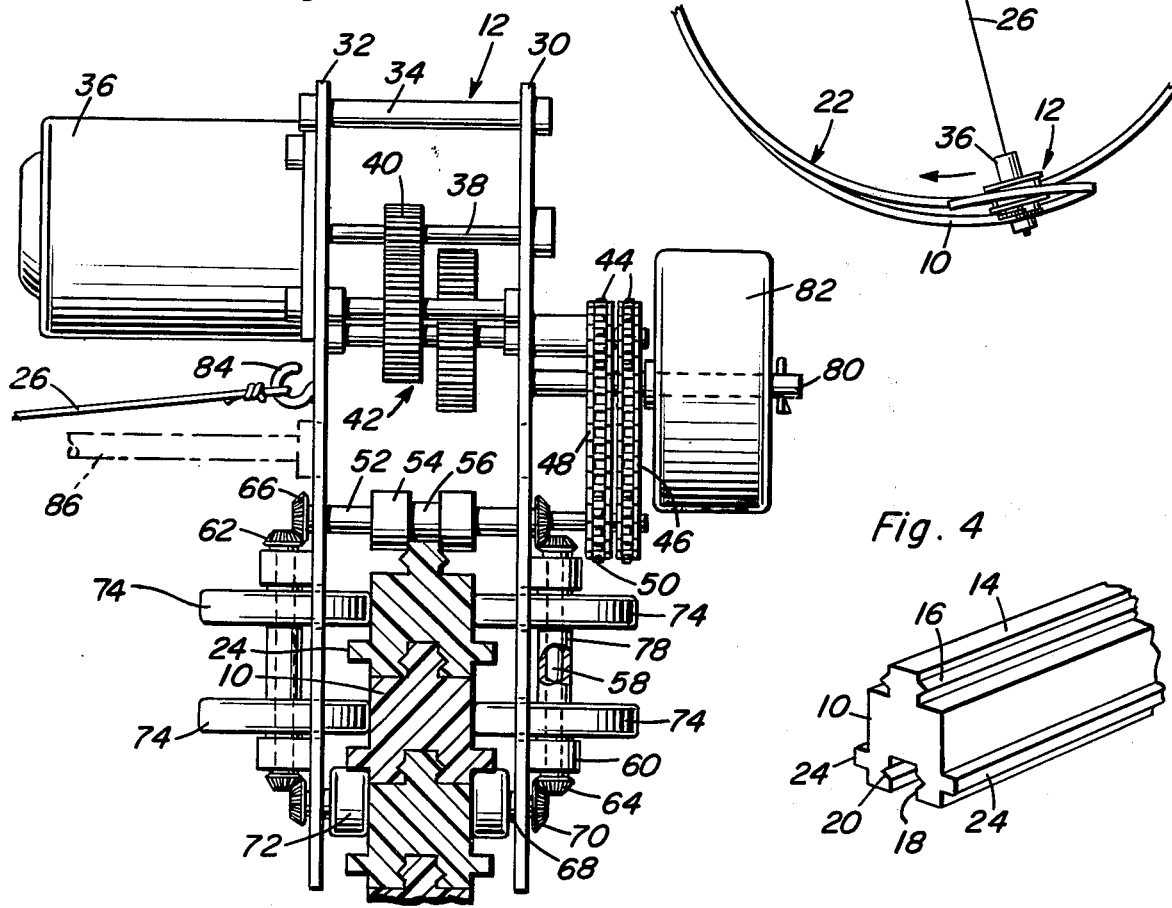
FIG. 3 is an enlarged sectional view taken on line 3—3 of FIG. 1 and illustrating the manner in which one embodiment of the wall forming strip is interlocked together with the structural details of an apparatus for forming the wall from this embodiment of the strip.
Figure 4:
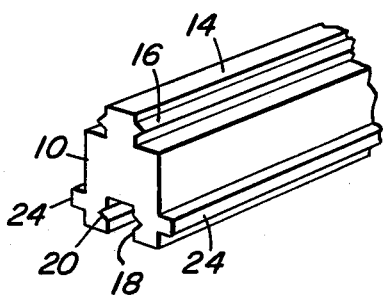
FIG. 4 is a fragmental perspective view of the strip illustrated in FIG. 3.

Referring now to the drawings in detail, FIG. 1 illustrates a peripheral wall which may be vertical or dome-shaped, or any other suitable shape, is constructed from a strip 10 of plastic material which is sufficiently flexible to enable it to be conformed to the desired curvature and to enable it to be spirally shaped and assembled by the use of an apparatus generally designated by the numeral 12. As best seen in FIGS. 3 and 4, the plastic strip 10 includes a longitudinal rib or tongue 14 along the top edge thereof with the width of the tongue 14 being substantially less than the transverse thickness of the strip 10. Each side wall of the tongue 14 is provided with a longitudinally extending outwardly projecting V-shaped rib 16 thereon which is disposed substantially in the center of the vertical side wall of the tongue 14. The underside of the plastic strip 10 is provided with a complementary groove 18 that is substantially the same shape and size as the tongue 14 for telescopically receiving the tongue 14 when successive lengths of the strip are superimposed onto one another to form the wall. The two side walls of the groove 18 are provided with V-shaped recesses 20 which correspond in shape to the V-shaped ribs 16 so that when the overlying convolutions of the strip are secured together by forcing the groove 18 downwardly into the tongue 14, the ribs 16 will snap into the recesses 20 thus securely but releasably locking the convolutions of the strip together to form a continuous cylindrical wall structure which is generally designated by numeral 22 in FIG. 1, and which includes the plurality of superimposed convolutions of plastic strip 10.

Also, each vertical side wall of the plastic strip 10 is provided with a laterally projecting flange 24 that is disposed adjacent the lower edge of the strip as illustrated in FIGS. 3 and 4. The flanges 24 have horizontal upper and lower surfaces although the upper and lower surfaces may converge slightly towards each other.

As illustrated in FIG. 1, the strip 10 is assembled by an apparatus 12 with the uppermost convolution of the strip 10 preferably being continuous with the lowermost convolution thereof so that as the lowermost convolution is removed, it may be reapplied to the top of the wall 22. The apparatus 12 is guided by a flexible radial line 26 that may be anchored at a centerpoint 28 of the wall 22 which is illustrated as being cylindrical in configuration. It is, of course, understood that other configurations of the wall may be formed with suitable guide means for the apparatus, it only being necessary that any directional changes in the wall be gradual curves which may be traversed by the apparatus laying the plastic strip in place.

The apparatus 12 for forming the successive convolutions or lengths of the strip 10 into a wall includes a pair of spaced side plates 30 and 32 which are rigidly interconnected by spacer assemblies 34 which may be in the form of a rod secured fixedly to the plates in any suitable manner with the spacer assemblies being located at the upper ends of the plates 30 and 32 thus leaving the space between the lower portions of the plates unobstructed for receiving the upper convolutions of the wall 22.

Mounted on plate 32 is a drive motor 36 having an output shaft 38 journaled in the plates 32 and 30, with the shaft 38 having a gear 40 thereon in meshing engagement with a reduction gear assembly 42 that drives a pair of identical sprocket output gears 44 mounted on the exterior of the plate 30. The sprocket gears 44 drive a pair of sprocket chains 46 and 48 which, in turn, extend downwardly and drive a pair of sprocket gears 50 mounted one on the end of each of a pair of shafts 52 journaled in the plates 30 and 32 as illustrated in FIG. 1. The shafts 52 each have a pair of spaced cylindrical collars 54 mounted thereon to receive the upper edge portion of the tongue 14, and a cylindrical sleeve 56 is mounted between the collars 54 in position to engage the top surface of the tongue 14 and force it downwardly to thereby force the uppermost convolution of the strip 10 into interlocking relation with the convolution therebelow. The collars 54 and the cylindrical sleeves 56 may be rigid with the shafts 52 and driven thereby so that rotation of the shafts 52 will assist in moving the apparatus 12 along the wall 22.

Mounted on each of the plates 30 and 32 is a pair of vertically disposed shafts 58 that are journaled in suitable bearing blocks 60. Shafts 58 each have a bevel gear 62 on their upper end and a similar bevel gear 64 on their lower end. The upper bevel gears 62 are in meshing engagement with corresponding bevel gears 66 on the ends of shafts 52 exteriorly of the respective plates 30 and 32. Thus, as the chains 46 and 48 drive the two shafts 52, all four gears 66 will be rotated and all four gears 62 will be rotated thus rotating all of the shafts 58 and the bevel gears 64 on the lower end thereof.

Mounted on each of the plates 30 and 32 beneath the respective shafts 52 is a stub shaft 68 having a bevel gear 70 on the outer end thereof in meshing engagement with the bevel gear 64, and a roller 72 on the inner end thereof which engages the undersurface of the flange 24 on a lower convolution of the plastic strip 10 forming the wall 22 as illustrated in FIG. 3. Thus, with the rollers 72 being spaced apart a distance substantially equal to the width of the strip 10 and being vertically spaced from the shaft and collars 54 and cylindrical portion 56 a distance substantially equal to the aggregate vertical dimension between the bottom surfaces of the flanges 24 on a lower strip and the top edge of the tongue 14 on an upper strip, the upper convolution or strip will be forced into locked engagement with the next lower strip. Also, rotation of the rollers 72 by their driving engagement with the drive sprocket gears and chains will cause movement of the apparatus progressively around the wall 22.

Also mounted on each of the shafts 58 is a pair of rollers or wheels 74 that extend through slots 76 in each of the walls 30 and 32 and engage the uppermost convolution of the strip 10 and the next adjacent lower convolution so that the respective rollers or wheels will retain the convolutions in alignment with each other so that the tongue 14 will be aligned with the groove 18 as the uppermost convolution is being applied to a lower convolution. A spacer 78 retains the rollers or wheels 74 in their vertically spaced relation and these wheels are also driven by virtue of their connection with the shafts 58 thus further facilitating movement of the apparatus along the wall 22.

For balancing the device, a laterally extending rod 80 is provided on the plate 30 in generally opposed relation to the motor 36 with the rod 80 including a counterbalancing weight 82 thereon. Thus, the weight 82 and the weight of the motor 36 will substantially balance each other so that a flexible string 26 may be employed to guide the apparatus around a closed path with the string merely being secured to a hook 84 on the plate 32 at a point below the motor 36. The weight 82 is removable and, if desired, the rod 80 may also be removed inasmuch as the string and weight may not be used in certain installations such as when a rigid radius rod 86 is employed which may be attached to a screw-threaded opening in the plate 32. This type of rod 86 is also employed to attach another identical apparatus 12 rigidly with respect to the disclosed apparatus 12 so that two walls may be simultaneously formed which are spaced apart a predetermined distance, thereby enabling the radius rod to be employed from either side of the machine since an identical threaded opening is provided in each of the plates 32 and 30. Thus, this device is effective for use in forming a wall which is used as a form for a hardenable material such as concrete or the like with the lowermost convolution of the wall being removed and defining an endless loop around to the front of the apparatus for thus forming the uppermost convolution as illustrated in FIG. 1.

When it is desired to progressively form the respective walls from a continuous strip of the plastic material by stripping the convolutions from one end of the wall and simultaneously feeding it on to the other end as illustrated in FIG. 1, the embodiment of the invention illustrated in detail in FIGS. 5-11 is preferred. In this embodiment, the plastic strip 110 is dimensioned to present substantially uniform resistance to bending in all directions about its longitudinal axis and includes a generally parallelogram-shaped body portion 112 having parallel side faces 114 each having an outwardly projecting flange 116 integrally formed thereon, and a pair of inclined parallel end faces 118. A pair of locking flanges 120 are formed on the body 112, one at two diametrically opposed corners of the body portion 112, with the interlocking flanges 122 extending in spaced, overlying relation to the edge surfaces 118. The flanges 120 are generally L-shaped and joined to the body at the toe portion of the L. The flanges have an enlarged or bulbous free end portion 122 dimensioned to fit snugly into a complementary undercut space 124 of a similar strip when assembled in edge-to-edge relation to firmly interlock the two strips together.

Figure 8:
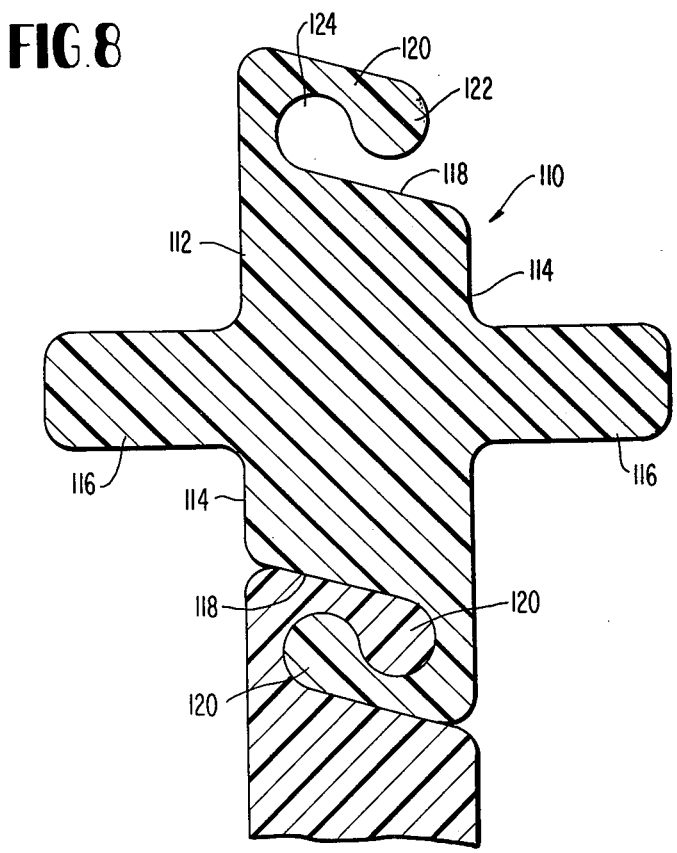
FIG. 8 is an enlarged sectional view of a preferred configuration of the plastic strip.
Figure 9:
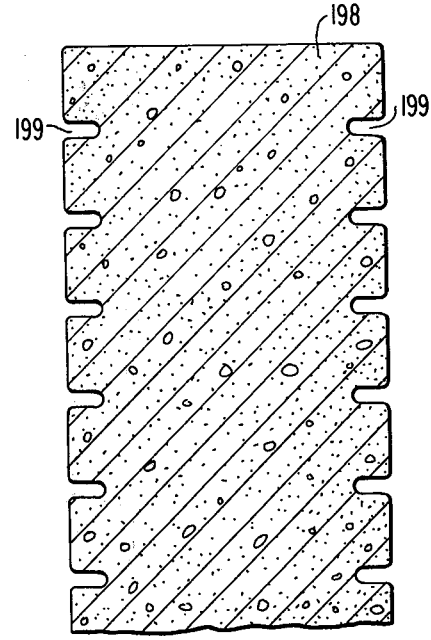
FIG. 9 is a fragmentary sectional view of a concrete wall cast in a form constructed from the plastic strip illustrated in FIG. 8.

By forming the plastic strip 110 from a resilient material such as high density polyethylene or other suitable polymeric material, the flanges 120 can be deflected sufficiently to permit successive strips, or convolutions, of the plastic to be progressively joined in interlocking tongue-and-groove relation to form a rigid, substantially fluid-tight connection as illustrated in FIG. 8. At the same time, the strips may be disassembled by progressively pulling one of the strips laterally with sufficient force to disengage the intelocking tongue-and-groove joint. This may be accomplished, as illustrated in FIGS. 10 and 11, by a suitable roller or other device drawn or driven between successive convolutions to force them laterally apart. Conversely, the successive strips in a wall are assembled by forcing them together laterally rather than vertically as in the first described embodiment. This gives the advantage of being able to withdraw the strips from the wall without the risk of damage to the newly poured wall or damage to the inwardly projecting flange on the strip.

Figure 5:
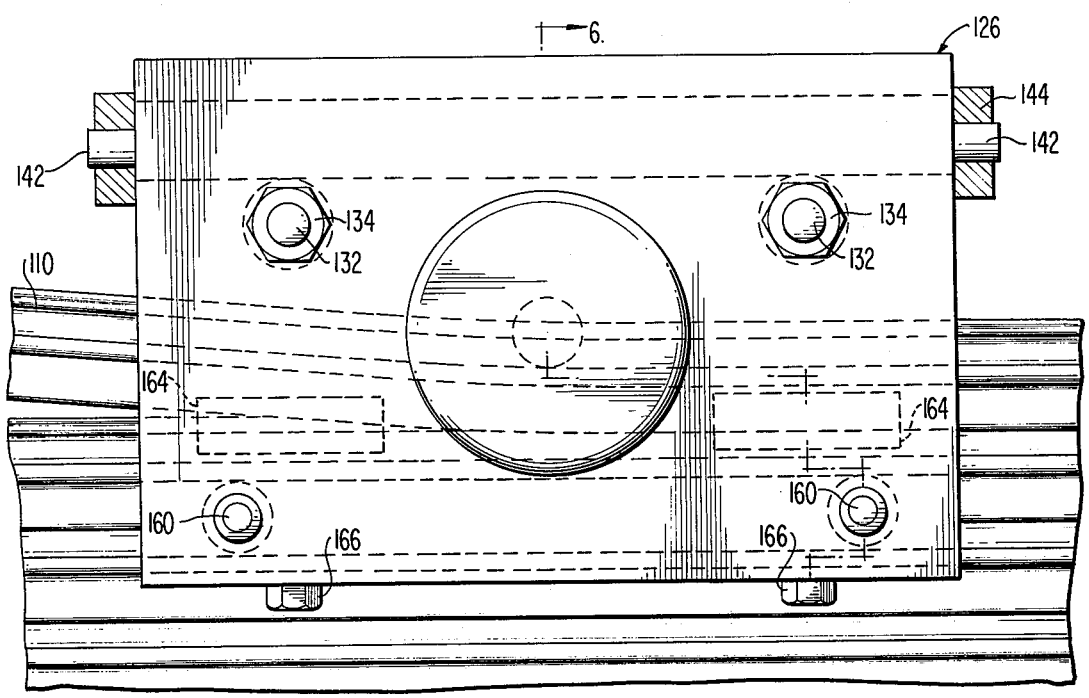
FIG. 5 is an elevation view similar to FIG. 1 and illustrating an alternate embodiment of the invention.
Figure 6:
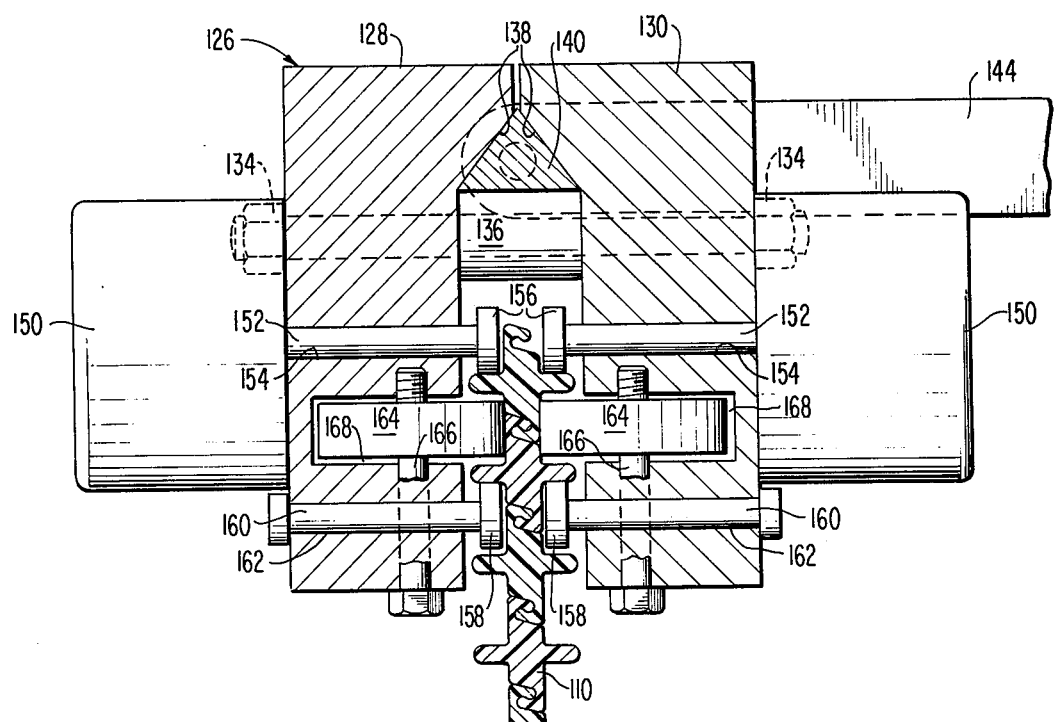
FIG. 6 is a sectional view taken on line 6—6 of FIG. 5.
Figure 7:
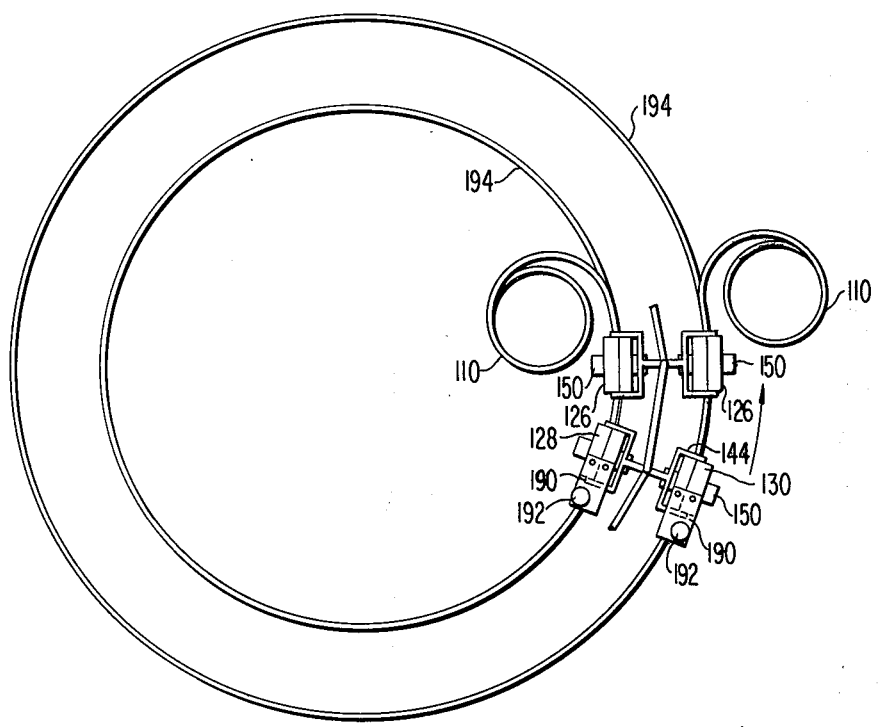
FIG. 7 is a top plan view illustrating a plurality of the devices shown in FIG. 5 being employed to simultaneously construct two concentric form walls.

Referring now to FIGS. 5-7, an apparatus for progressively assembling, or laying up, the strips 110 will be described in detail. This apparatus, indicated generally by the reference numeral 126, incorporates a frame made up of a pair of opposed frame block or plate members 128, 130 which are substantially mirror images of one another and retained in assembled relation by a pair of transversely extending bolts 132 and nuts 134. A pair of cylindrical spacers 136 mounted one on each of the bolts 132 between blocks 128, 130 retain the blocks in opposed spaced relation. Each of the blocks 128, 130 are formed with an inwardly and downwardly inclined surface 138 on their inner faces adjacent the top portion thereof, with the surfaces 138 being adapted to engage and firmly clamp a triangular-shaped bar 140 positioned therebetween and supported on the top surface of the spacers 136 so that, when the nuts 134 are tightened on bolts 132, the triangular bar 140 will be rigidly clamped into position between the two plates 128, 130 and thereby lend support thereto to prevent separation of the plates near the bottom and avoid bending of the clamping bolts. Triangular bar 140 has integrally formed on its opposed ends a cylindrical stud 142 for pivotally supporting a yoke member 144, the purpose of which will be more fully described hereinbelow.

To propel the apparatus around the top periphery of a wall being assembled thereby, a pair of motors 150 are mounted one on the outer surface of each of the blocks 128, 130, with each motor driving a shaft 152 journaled within a bore 154 in the respective frame blocks. A pair of drive wheels 156 are mounted one on the inwardly projecting end of each of the shafts 152 in position to engage and rest upon the upwardly directed surface of the respective flanges 116 of the plastic strip 110 to thereby support the weight of the apparatus on the top edge of a vertical wall being assembled. If desired, the peripheral surface of the wheels 156 may be knurled or otherwise roughened to increase the friction with the top of the flanges 116 to propel the apparatus along the length of the topmost course of the plastic strip being laid onto the wall.

Cooperating with the drive rolls 156 to accurately position the assembly apparatus 126 on the top edge of the wall are two pairs of idler rolls 158, mounted one pair on each of the blocks 128, 130, by shafts 160. The shafts 160 are journaled for rotation about an axis parallel to the axis of drive shaft 152 by bores 162 extending therough the respective frame blocks 128, 130. The bores 162 in the respective block are positioned one forward and one aft of the drive shaft and spaced therebelow in position to engage the undersurface of the flanges 116 on the plastic strip next below the strip being positioned on the top of the wall. Thus, the distance between the top of the flanges 116 on the strip being positioned and the bottom of the flanges on the strip last positioned on the wall is fixed by the drive wheels 156 and the idler wheels 158.

To firmly interlock the successive convolutions of the plastic strip, a pair of pressure rolls 164 are mounted one in each of the blocks 128, 130 for rotation about parallel spaced axes extending perpendicular to the direction of movement of the apparatus along the wall. The pressure rolls 164 are spaced apart a distance equal to the thickness of the body 112 of the plastic strips and positioned to engage the strips to forcefully interlock the flanges 120 as shown in FIG. 6. The respective pressure rolls 164 are mounted on shafts 166 threaded into the bottom of the respective blocks 128, 130, with the respective rolls being positioned within laterally extending, opposed recesses 168 in the blocks.

The apparatus thus far described may be employed to progressively build a wall by continuously laying successive convolutions of the plastic strip 110 into a spiral pattern by drawing the strip from a supply reel or other suitable source. This is accomplished by providing suitable guide means for the yoke 144 in a manner described above with reference to the guide wire 26 or the bar 86. Further, a plurality of the devices may be connected together in tandem to simultaneously lay a plurality of convolutions onto the wall, and, as indicated in FIG. 7, where it is desired to simultaneously build a pair of opposed walls such as would be required for a concrete form or the like, the assembling devices may be connected in side-by-side relation, spaced apart a distance equal to the thickness of the walls, and driven to simultaneously build the two form walls.

The embodiment of the apparatus illustrated in FIGS. 10 and 11 is employed when it is desired to progressively form a wall from a single, endless length of the plastic strip material by withdrawing the lowermost convolution as the apparatus progresses around the wall and to lead this removed material upwardly into position to be fed onto the top. In this embodiment, a mounting plate 190 is bolted, by suitable bolts 191 on the top of the blocks 128, 130, with the mounting plate 190 projecting rearwardly from the blocks. A motor 192 is mounted on the plate 190 and drives a vertically extending shaft 193 which extends downwardly along the outer surface of the wall 194. A pair of rollers 195, 196 are mounted on the distal end of shaft 193, with the rollers being positioned apart a distance substantially equal to the thickness of the flange 116. Rollers 195, 196 are adapted to engage the inner surface 114 to act as a lever forcing disengagement of the interlocked flanges 120. A knurled drive roll 197 is mounted upon the shaft 193 in position to engage the outer urface of the wall 194 between adjacent flanges 116 to assist in driving the shaft 193 around the wall and maintain the shaft in a vertical position.

When the invention is employed to build a form wall suitable for the pouring of a wall, the outer form for a column, or the like, the hardenable material such as concrete, thermoplastic or thermosetting polymeric material, foamed plastic, or the like is poured into the form and permitted to harden progressively as the wall is formed. By employing a fast setting concrete or other material, the form can be stripped from the bottom and reassembled onto the top of the form wall so that the structure can be continuously poured without seams or joints. When used in an attitude to form a vertical or near vertical wall, the inwardly projecting flanges 116 will prevent the form wall and the form-laying apparatus from sliding down on the poured structure and thereby damaging or preventing the formation of a good surface on the structure per se.

Upon removing the form from the finished hardened poured structure such as wall 198, the structure will have a surface with a plurality of grooves 199 each corresponding to the dimension of the flange 116 extending along the outer surface. These grooves provide a desirable decorative effect in their existing form; however, when the grooved surface is not desired, the grooves nevertheless form a convenient means for permanently and firmly adhering a surface coating such as plaster or the like on the outer surface of the wall.

In some installations, the plastic strip 10 is constructed to be unwound from a supply reel to form a vertical wall or a dome which may be spherical in configuration. Other materials may be employed and the pressure locked connection between the convolutions of the strip may be either permanent or temporary to enable a permanent or temporary wall to be erected. Any practical wall thickness can be obtained by simply adjusting the yoke assemblies to provide the desired distance between the form walls.

The plastic material may be used to form various wall configurations with a permanent wall being formed or the vertically creeping form being employed to construct a wall of hardenable material with adequate control devices being provided to sense deviation from a desired path of movement and suitable corrective action can be initiated in response to the sensing mechanism. However, the construction of the wall by the balanced apparatus whether using the string control or rigid arm radial control provides sufficient accuracy without a vertical or horizontal sensing control device. If a permanent wall is to be constructed, the embodiment of the plastic strip illustrated in FIGS. 3 and 4 may be employed and a solvent used to "weld" adjacent strips by applying a coating of solvent to certain surface areas of the strip as it is being pressure locked together. The center of the radius string or radius rod may also be employed as a center for site preparation to facilitate initial operations in the construction of a building and removal and reuse of the lowermost convolution of plastic material employed in the creeping form provides for a continuous application of hardenable material to the upper surface of the wall as it is being formed with the spiral flanges on the inner surfaces of the walls of the form preventing downward sliding movement thereof during hardening of the material between the form walls.

A plurality of circumferentially spaced units as shown in FIG. 3 or of a similar construction may be required when constructing a dome-shaped building or during double wall construction for control of the shape and to prevent double wall separation while applying filler material. These units may be spaced by a rigid bar of a semi-rigid spacer or connecting assembly.

While the invention is described with reference to forming vertical walls and structural elements of buildings and the like, it is understood that it may also be used to form, for example, horizontal tunnels, or to continuously form pipe or conduit, columns, or the like. Also, various materials may be employed in the formation of the strip material, and it is contemplated that fast setting materials such as foamed plastic and the like may be employed as the hardenable material to thereby permit extremely fast molding of the material. Thus, while I have disclosed and described preferred embodiments of my invention, I wish it understood that I do not intend to be restricted solely thereto, but that I do intend to include all embodiments which would be apparent to one skilled in the art and which come within the spirit and scope of my invention.

What is claimed is:

1. In a process for constructing a structural member having one surface extending in a closed path and being formed from a hardenable material by placing the hardenable material while in a workable condition against a form wall and permitting the material to harden in situ, the improvement wherein said structural member is formed progressively from one end thereof by constructing a first form wall around said closed path with said wall extending from said one end for a portion of the length of said structural member by progressively shaping a strip of material into a series of convolutions extending around said closed path to define the path wall, progressively moving said first wall along said surface from said one end by progressively removing the convolutions of said strip of material from the end of said first form wall adjacent said one end of said structural member and applying convolutions of said strip material to the other end of said first form wall, and progressively casting hardenable material against said first form wall from said one end thereof and permitting said hardenable material to harden before said convolutions of strip material are removed therefrom, whereby said structural member is progressively cast from said one end as said form wall is moved along said one surface thereof.

2. The process as defined in claim 1 wherein said process comprises the steps of placing said hardenable material into contact with said form wall and of progressively moving said form wall along the length of said structural member in a substantially continuous process.

3. The process as defined in claim 1 wherein the convolutions removed from said one end of said form wall are lead to and progressively reapplied on the other end of said form wall.

4. The process as defined in claim 1 wherein said one surface of said structural member is substantially circular in cross section and has its axis extending substantially vertical, and wherein said first form wall is moved progressively upward along said surface as said structural member is formed.

5. The process as defined in claim 1 wherein said strip of material is formed with similar, oppositely directed tongues and grooves on the opposed side edges thereof adapted to cooperate to releasably interlock adjacent lengths of said strip into edge-to-edge relation, and wherein said step of forming said strip into said series of convolutions includes the step of releasably securing said convolutions in edge-to-edge relation by progressively pressing said tongues and grooves on successive convolutions into releasable interlocking relation.

6. The process as defined in claim 5 wherein the step of removing the convolutions includes the step of progressively forcing said strip of material at one end of said form wall from said interlocking relation with the adjacent strip, and progressively passing the strip thus released to the opposite end of said wall to be rejoined thereto.

7. The precess as defined in claim 6 wherein said strip of material is an endless band of flexible polymeric plastic material having a body defined by generally parallel sides and generally parallel edges with oppositely directed laterally extending tongues and grooves extending along said edges, and wherein said successive convolutions are joined by pressing them together in a direction generally normal to the plane of the form wall to thereby interlock the oppositely directed tongues and grooves on the adjacent convolutions.

8. The process as defined in claim 1 wherein said structural member is a generally vertically extending column. k 9. The process as defined in claim 1 wherein said step of forming said strip into said series of convolutions includes the step of releasably joining the successive convolutions in edge-to-edge relation, said process further comprising the steps of constructing adjacent said one end of said structural member and in generally concentric spaced relation to said first form wall, a second form wall by progressively shaping a length of strip material into a series of convolutions and releasably joining the convolutions into edge-to-edge relation to define the second form wall, and placing said hardenable material into the space between said first and said second form walls to define a generally tubular-shaped structural member.

10. The process as defined in claim 9 further comprising the steps of progressively moving said second form wall along said structural member by progressively removing the convolutions on one end and progressively applying convolutions to the opposite end thereof.

* * * * *